(12) United States Patent
Kamiya et al.

(10) Patent No.: US 10,484,408 B2
(45) Date of Patent: Nov. 19, 2019

(54) MALICIOUS COMMUNICATION PATTERN EXTRACTION APPARATUS, MALICIOUS COMMUNICATION PATTERN EXTRACTION METHOD, AND MALICIOUS COMMUNICATION PATTERN EXTRACTION PROGRAM

(71) Applicant: NIPPON TELEGRAPH AND TELEPHONE CORPORATION, Chiyoda-ku (JP)

(72) Inventors: Kazunori Kamiya, Musashino (JP); Kazufumi Aoki, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 242 days.

(21) Appl. No.: 15/520,194

(22) PCT Filed: Nov. 9, 2015

(86) PCT No.: PCT/JP2015/081498
§ 371 (c)(1),
(2) Date: Apr. 19, 2017

(87) PCT Pub. No.: WO2016/080232
PCT Pub. Date: May 26, 2016

(65) Prior Publication Data
US 2017/0310694 A1    Oct. 26, 2017

(30) Foreign Application Priority Data
Nov. 18, 2014    (JP) .................................. 2014-233617

(51) Int. Cl.
H04L 29/06    (2006.01)
G06F 16/28    (2019.01)
G06F 21/56    (2013.01)

(52) U.S. Cl.
CPC ........ *H04L 63/1425* (2013.01); *G06F 16/285* (2019.01); *G06F 21/56* (2013.01);
(Continued)

(58) Field of Classification Search
CPC ... H04L 63/20; H04L 63/145; H04L 63/1425; G06F 116/285; G06F 21/561;
(Continued)

(56) References Cited

U.S. PATENT DOCUMENTS 7,643,496 B1 *   1/2010   Jamieson ................ H04L 47/10
                                                    370/400
9,684,705 B1 *   6/2017   Satish ..................... G06F 21/56
(Continued)

FOREIGN PATENT DOCUMENTS

JP    2012-84994 A    4/2012
JP    5009244 B2      8/2012

OTHER PUBLICATIONS

International Search Report dated Feb. 9, 2016 in PCT/JP2015/081498 filed Nov. 9, 2015.
(Continued)

*Primary Examiner* — Daniel B Potratz
*Assistant Examiner* — Vu V Tran
(74) *Attorney, Agent, or Firm* — Oblon, McClelland, Maier & Neustadt, L.L.P.

(57) ABSTRACT

A malicious communication pattern extraction apparatus extracts communication patterns of traffic group of malwares, and replaces the values of predetermined field with variation in a traffic group with a wild card. Further, the malicious communication pattern extraction apparatus classifies pieces of malware having similar communication patterns in the traffic group into the same cluster, and for each cluster, extracts, as a malicious communication pattern, a communication pattern group having an appearance rate in a traffic group of respective pieces of malware in the cluster, the appearance rate being equal to or larger than a predetermined value. Thereafter, the malicious communication pattern extraction apparatus eliminates, from the extracted malicious communication patterns, any malicious communication pattern having a conformance rate to a traffic group
(Continued)

not infected with malware, the conformance rate being equal to or larger than a predetermined value.

7 Claims, 19 Drawing Sheets

(52) U.S. Cl.
CPC .......... *G06F 21/561* (2013.01); *G06F 21/565* (2013.01); *G06F 2221/2147* (2013.01); *H04L 63/145* (2013.01)

(58) Field of Classification Search
CPC .................. G06F 21/56; G06F 21/565; G06F 2221/2147; G06F 16/285
See application file for complete search history.

(56) References Cited

U.S. PATENT DOCUMENTS

| | | | |
|---|---|---|---|
| 2011/0283361 A1* | 11/2011 | Perdisci | G06F 21/56 726/24 |
| 2011/0302654 A1* | 12/2011 | Miettinen | G06F 21/552 726/23 |
| 2015/0026808 A1 | 1/2015 | Perdisci et al. | |

OTHER PUBLICATIONS

Shenk, Jerry, "SANS Eighth Annual 2012 Log and Event Management Survey Results: Sorting Through the Noise," SANS Institute InfoSec Reading Room, Oct. 2014, pp. 1-10, pp. 12-15, <http://www.sans.org/reading-room-whitepapers/analyst/eight-annual-2012-log-event-management-survey-results-sorting-noise-35230>.

Perdisci, Roberto et al., "Behavioral Clustering of HTTP-Based Malware and Signature Generation Using Malicious Network Traces," NSDI, Apr. 2010, pp. 1-14.

Koide, Takashi et al., "Detection and Classification Method for Malicious Packets with Characteristic Network Protocol Header," Computer Security Symposium 2014 Ronbunshu, Oct. 2014, 10 pages.

Nakata, Kensuke et al., "Ruleset Optimization for Detecting Malware-Derived Traffic Based on Network-Dependent Log Analysis," IEICE Technical Report, vol. 113, No. 502, Mar. 2014, 8 pages.

* cited by examiner

FIG.2

| MALWARE IDENTIFIER | PROTOCOL | DESTINATION PORT NUMBER | DESTINATION IP ADDRESS | DESTINATION ORGANIZATION | TRANSMISSION SOURCE PORT NUMBER | NUMBER OF TRANSMITTED BYTES |
|---|---|---|---|---|---|---|
| M1 | UDP | 53 | 192.0.2.0 | A | 1037 | 20 |
| M1 | UDP | 53 | 192.0.2.0 | A | 1038 | 25 |
| M1 | UDP | 53 | 192.0.2.0 | A | 1039 | 20 |
| M1 | TCP | 80 | 192.0.2.1 | B | 1035 | 128 |
| M1 | TCP | 80 | 192.0.2.1 | B | 1035 | 128 |
| M1 | UDP | 16471 | 192.0.2.2 | C | 1056 | 16 |
| M1 | UDP | 16471 | 192.0.2.3 | C | 1062 | 16 |
| M1 | UDP | 16471 | 192.0.2.4 | D | 1056 | 16 |

FIG.5

| MALWARE IDENTIFIER | PROTOCOL | DESTINATION PORT NUMBER | DESTINATION IP ADDRESS | DESTINATION ORGANIZATION | |
|---|---|---|---|---|---|
| M1 | UDP | 53 | 192.0.2.0 | A | ⎫ |
| M1 | TCP | 80 | 192.0.2.1 | B | |
| M1 | UDP | 16471 | * | * | |
| M1 | TCP | 80 | 203.0.113.0 | A | ⎬ 502 |
| M2 | UDP | 53 | 192.0.2.0 | A | |
| M2 | TCP | 80 | 192.0.2.1 | B | |
| M2 | UDP | 16471 | * | * | ⎭ |
| M3 | UDP | 53 | 192.0.2.0 | A | ⎫ |
| M3 | UDP | 53 | 192.0.2.4 | Outside DNS1 | ⎬ 503 |
| M3 | UDP | 53 | 192.0.2.5 | Outside DNS2 | |
| M3 | UDP | 53 | 192.0.2.6 | Outside DNS3 | ⎭ |

FIG.16

| MALWARE IDENTIFIER | INDIVIDUAL IDENTIFIER | PROTOCOL | DESTINATION PORT NUMBER | DESTINATION IP ADDRESS | DESTINATION ORGANIZATION |
|---|---|---|---|---|---|
| M1 | M1-a | UDP | 53 | 192.0.2.0 | A |
| M1 | M1-b | TCP | 80 | 192.0.2.1 | B |
| M1 | M1-d | TCP | 80 | 203.0.113.0 | A |

| MALWARE IDENTIFIER | INDIVIDUAL IDENTIFIER | PROTOCOL | DESTINATION PORT NUMBER | DESTINATION IP ADDRESS | DESTINATION ORGANIZATION |
|---|---|---|---|---|---|
| M2 | M2-a | UDP | 53 | 192.0.2.4 | A |
| M2 | M2-b | TCP | 80 | 192.0.2.1 | B |

FIG.17

| MALWARE IDENTIFIER | INDIVIDUAL IDENTIFIER | PROTOCOL | DESTINATION PORT NUMBER | DESTINATION IP ADDRESS | DESTINATION ORGANIZATION |
|---|---|---|---|---|---|
| M1 | M1-a | UDP | 53 | 192.0.2.0 | A |
| M1 | M1-b | TCP | 80 | 192.0.2.1 | B |
| M1 | M1-c | UDP | 16471 | * | * |
| M1 | M1-d | TCP | 80 | 203.0.113.0 | A |

| MALWARE IDENTIFIER | INDIVIDUAL IDENTIFIER | PROTOCOL | DESTINATION PORT NUMBER | DESTINATION IP ADDRESS | DESTINATION ORGANIZATION |
|---|---|---|---|---|---|
| M2 | M2-a | UDP | 53 | 192.0.2.4 | A |
| M2 | M2-b | TCP | 80 | 192.0.2.1 | B |
| M2 | M2-c | UDP | 16471 | * | * |

FIG.18

| COMMUNICA-TION PATTERN IDENTIFIER | INDIVIDUAL IDENTIFIER | PRO-TOCOL | DESTINA-TION PORT NUMBER | DESTINATION IP ADDRESS | DESTINA-TION ORGAN-IZATION | SATISFAC-TION OF CONDITION |
|---|---|---|---|---|---|---|
| S1 | S1-a | UDP | 53 | 192.0.2.0 | A | NOT OK |
|  | S1-b | TCP | 80 | 192.0.2.4 | B | OK |
|  | S1-c | UDP | 16471 | * | * | OK |

180

| TRANS-MISSION SOURCE IP ADDRESS | PRO-TOCOL | DESTINA-TION PORT NUMBER | DESTINATION IP ADDRESS | DESTINA-TION ORGAN-IZATION | TRANS-MISSION SOURCE PORT NUMBER | NUM-BER OF TRANS-MITTED BYTES |
|---|---|---|---|---|---|---|
| 10.0.0.1 | TCP | 80 | 192.0.2.4 | B | 1038 | 25 |
| 10.0.0.1 | UDP | 16471 | 203.0.113.0 | A | 1039 | 20 |
| 10.0.0.1 | UDP | 16471 | 203.0.113.1 | E | 1035 | 128 |
| 10.0.0.1 | TCP | ... | ... | ... | ... | ... |
| 10.0.0.1 | UDP | 16471 | 203.0.113.2 | F | 1056 | 16 |
| 10.0.0.1 | TCP | 80 | 203.0.113.3 | F | 1062 | 16 |

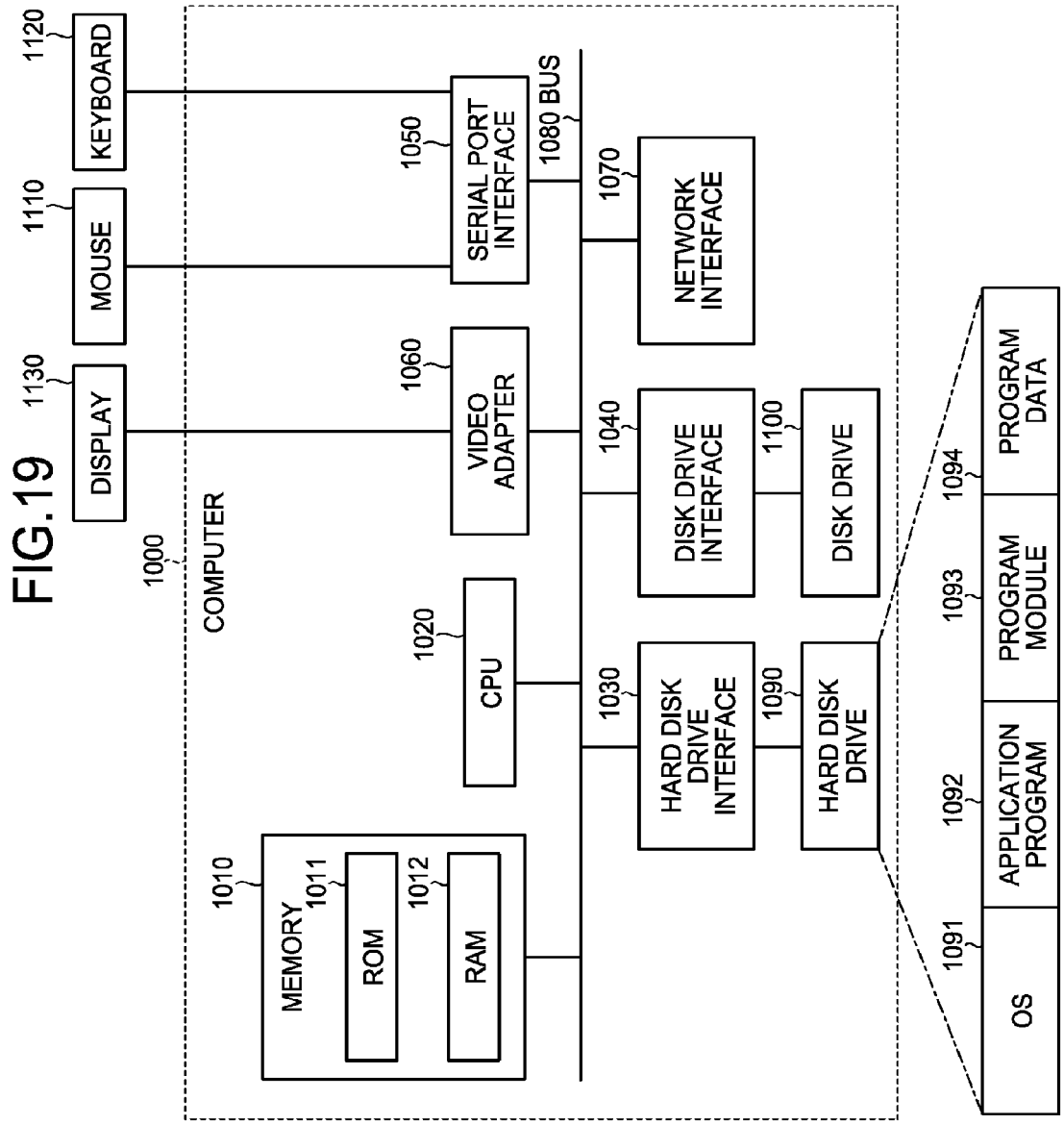

MALICIOUS COMMUNICATION PATTERN EXTRACTION APPARATUS, MALICIOUS COMMUNICATION PATTERN EXTRACTION METHOD, AND MALICIOUS COMMUNICATION PATTERN EXTRACTION PROGRAM

FIELD

The present invention relates to a malicious communication pattern extraction apparatus, a malicious communication pattern extraction method, and a malicious communication pattern extraction program.

BACKGROUND

Conventional countermeasures against cyber attacks have involved entrance countermeasures by antivirus software and the like, but have been unable to prevent infection completely, and thus importance of exit countermeasures preventing expansion of damage after malware infection has been increasing.

By the exit countermeasures, infected terminals are found and the malware infected terminals are disconnected from the network. One method of identifying any malware infected terminal is a method, in which a blacklist related to IP addresses, URLs, and the like of communication destinations that are characteristic of malware is used, and any terminal that performs communication with a destination at an IP address or URL in this blacklist is identified.

CITATION LIST

Patent Literature

Patent Literature 1: Japanese Patent No. 5009244

Non-Patent Literature

Non-Patent Literature 1: SANS Eighth Annual 2012 Log and Event Management Survey Results: Sorting Through the Noise, [online], [Retrieved on Oct. 31, 2014], from the Internet <URL:http://www.sans.org/reading-room/white-papers/analyst/eighth-annual-2012-log-event-management-survey-results-sorting-noise-35230>

Non-Patent Literature 2: R. Perdisci et al., "Behavioral Clustering of HTTP-Based Malware and Signature Generation Using Malicious Network Traces", NSDI, April 2010

SUMMARY

Technical Problem

However, since recent malware performs various communications, just using communication destination IP addresses, URLs, and the like may result in erroneous detection. Further, there is a method, in which matching is performed by use of individual malware communications as they are as communication patterns in order to detect any communication with malware, but types of malware are increasing day after day, and thus increasing communication patterns according to the increase in types of malware increases the processing time for the matching and efficient malware detection is unable to be performed. Therefore, an object of the present invention is to solve the above described problems to thereby reduce erroneous detection of malware, and perform efficient malware detection.

Solution to Problem

To solve the above-described problems, the present invention is a malicious communication pattern extraction apparatus, comprising: an input receiving unit that receives input of a traffic group of one or more pieces of malware; a communication pattern extraction unit that extracts, when extracting communication patterns from the input traffic group, for any traffic group with variation in values of a predetermined field thereof, a communication pattern with a wild card having replaced the values of the field with the variation; a clustering unit that classifies pieces of malware with the extracted communication patterns similar to each other, into the same cluster; a cluster specific communication pattern extraction unit that extracts, for each of the clusters, a communication pattern group as a malicious communication pattern, the communication pattern group having an appearance rate in traffic of respective pieces malware belonging to that cluster, the appearance rate being equal to or larger than a predetermined value; and a normal communication pattern elimination unit that eliminates, from the extracted malicious communication patterns, any malicious communication pattern having a conformance rate to a traffic group not infected with malware, the conformance rate being equal to or larger than a predetermined value.

Advantageous Effects of Invention

According to the present invention, erroneous detection of malware is able to be reduced, and efficient malware detection is able to be performed.

BRIEF DESCRIPTION OF DRAWINGS

FIG. 2 is a diagram illustrating an example of a log of traffic handled by the malicious communication pattern extraction apparatus in FIG. 1.

FIG. 5 is a diagram illustrating an example of clustering of communication patterns of malware.

FIG. 16 is a diagram illustrating an example of malicious communication patterns used in similarity calculation.

FIG. 17 is a diagram illustrating an example of malicious communication patterns used in similarity calculation.

FIG. 18 is a diagram illustrating an example of training traffic and a malicious communication pattern, which are used in conformance rate calculation.

FIG. 19 is a diagram illustrating a computer that executes a malicious communication pattern extraction program.

DESCRIPTION OF EMBODIMENTS

Figure 1:
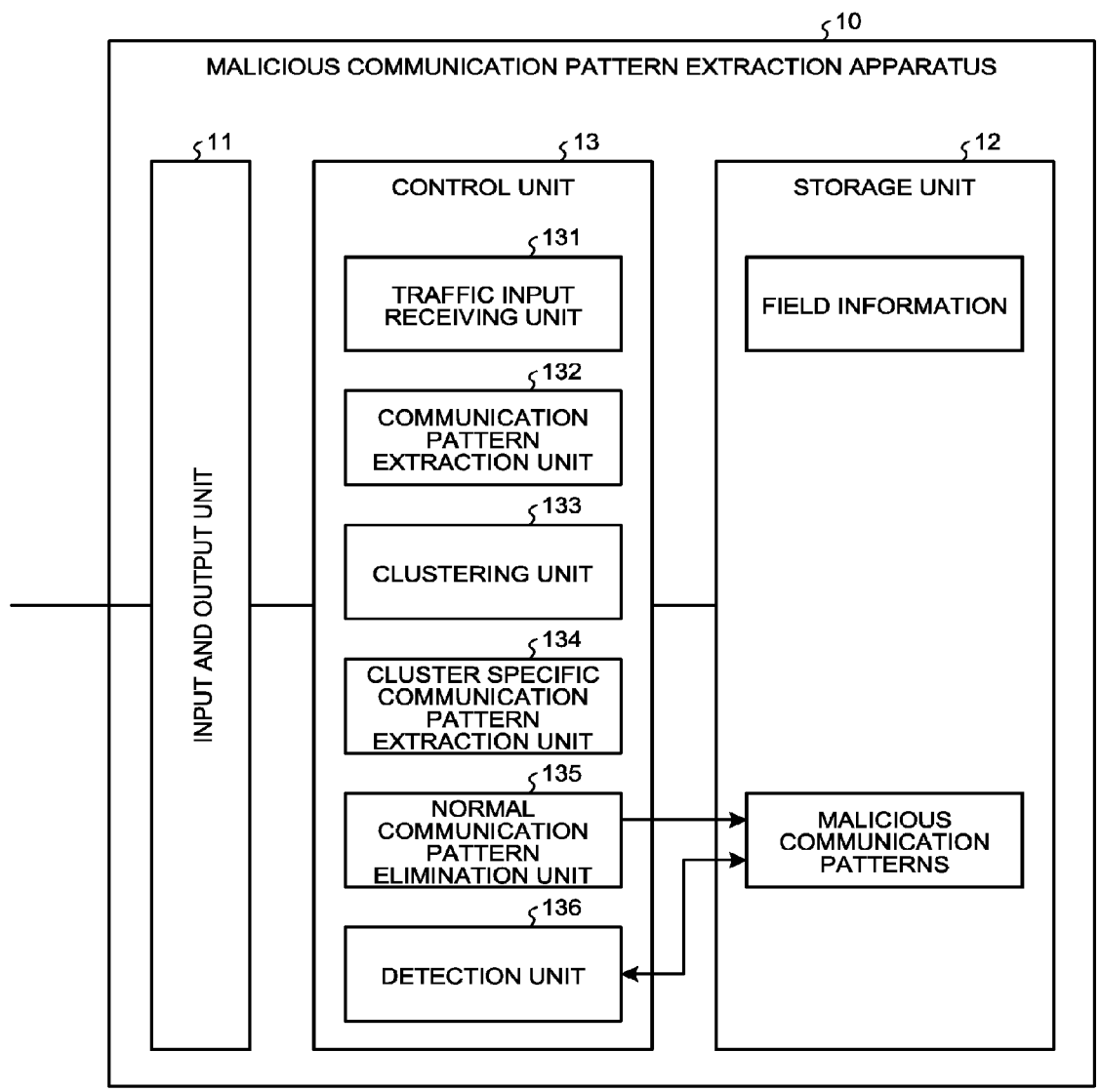
FIG. 1 is a diagram illustrating a configuration of a malicious communication pattern extraction apparatus.

Hereinafter, with reference to the drawings, a mode (embodiment) for carrying out the present invention will be described. First of all, by use of FIG. 1, a configuration of a malicious communication pattern extraction apparatus 10 according to this embodiment will be described. The present invention is not limited by this embodiment.

The malicious communication pattern extraction apparatus 10 includes an input and output unit 11, a storage unit 12, and a control unit 13. The input and output unit 11, for example, receives input of traffic of malware to be subjected to malicious communication pattern extraction, traffic to be subjected to abnormal traffic detection, and the like, and outputs results of abnormal traffic detection by the control unit 13. Hereinafter, a case where traffic input to the malicious communication pattern extraction apparatus 10 is a log of past traffic will be described as an example, but limitation is not made thereto.

An example of a log of traffic of malware, the log being input to the input and output unit 11, is illustrated in FIG. 2. For example, the log of traffic is, as illustrated in FIG. 2, formed of information, such as malware identifiers of pieces of malware generating the traffic, protocols of the traffic, destination port numbers, destination IP addresses, destination organizations, transmission source port numbers, and the numbers of transmitted bytes. A destination organization may not be included in the traffic, but for example, is able to be identified by the destination IP address of the traffic and the GeoIP (registered trademark) of MaxMind, Inc. The log of traffic may include, in addition to the above mentioned information, information, such as country names of the destinations of the traffic, the autonomous system (AS) numbers, the IP prefixes, the application names, and the numbers of flows included in the traffic. The country name of the destination is able to be identified from the destination IP address and the GeoIP (registered trademark) of MaxMind, Inc. Further, the AS number and the IP prefix are able to be identified from the destination IP address and the routing table. The application name is able to be identified from the destination port number.

Figure 6:
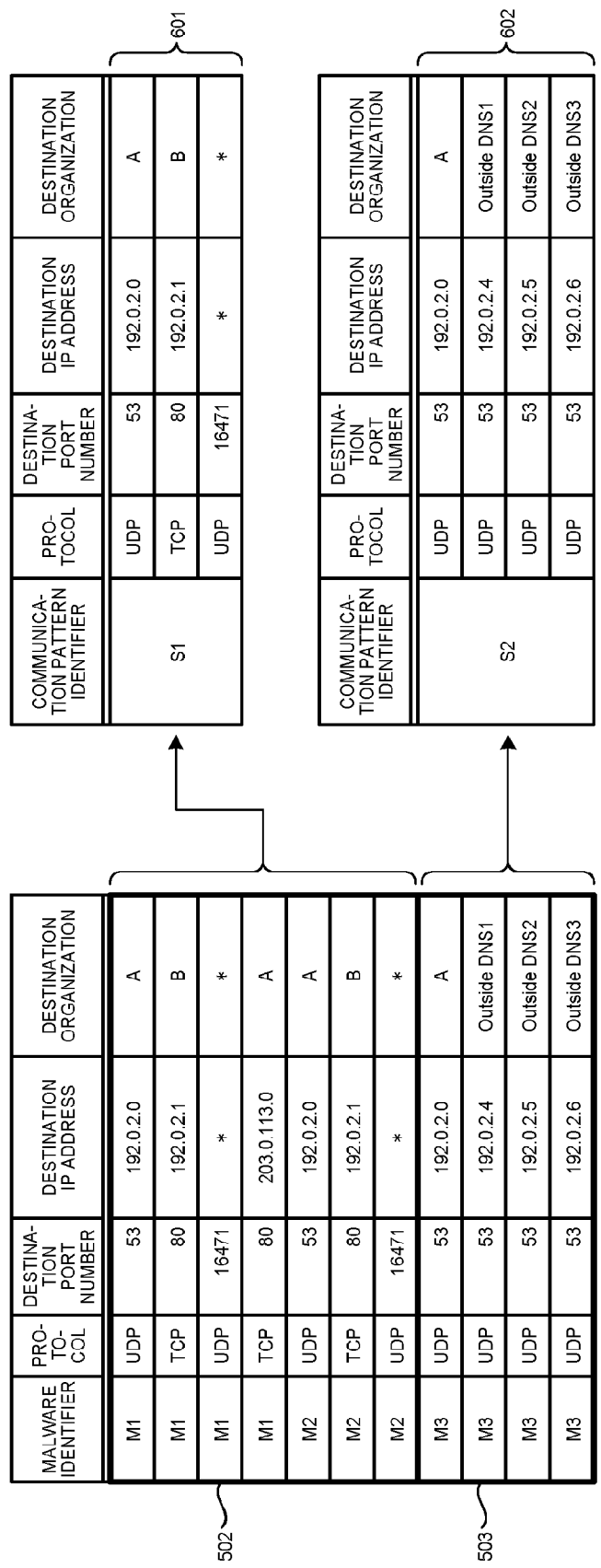
FIG. 6 is a diagram illustrating an example of extraction of malicious communication patterns.

The storage unit 12 stores therein field information and malicious communication patterns. The field information is information indicating fields of traffic to be subjected to communication pattern extraction in the control unit 13 (for example, protocol, destination port number, destination IP address, transmission source port number, and the number of transmitted bytes). For example, the control unit 13 refers to this field information, and from the input log of traffic, extracts, as a communication pattern, values of the fields of protocol, destination port number, destination IP address, transmission source port number, and the number of transmitted bytes. A malicious communication pattern is a communication pattern used by the control unit 13 in detection of any abnormal traffic, and for example, includes one or more communication patterns, as illustrated in FIG. 6. For example, a malicious communication pattern illustrated in FIG. 6 and having a malicious communication pattern identifier=S1 includes three communication patterns indicated with a reference numeral 601, and a malicious communication pattern having a malicious communication pattern identifier=S2 includes four communication patterns indicated with a reference numeral 602. These malicious communication patterns are extracted by the control unit 13 from traffic of malware.

The control unit 13 is in charge of control of the whole malicious communication pattern extraction apparatus 10, and includes a traffic input receiving unit 131, a communication pattern extraction unit 132, a clustering unit 133, a cluster specific communication pattern extraction unit 134, a normal communication pattern elimination unit 135, and a detection unit 136.

The traffic input receiving unit 131 receives input of a log of traffic (see FIG. 2).

Figure 3:
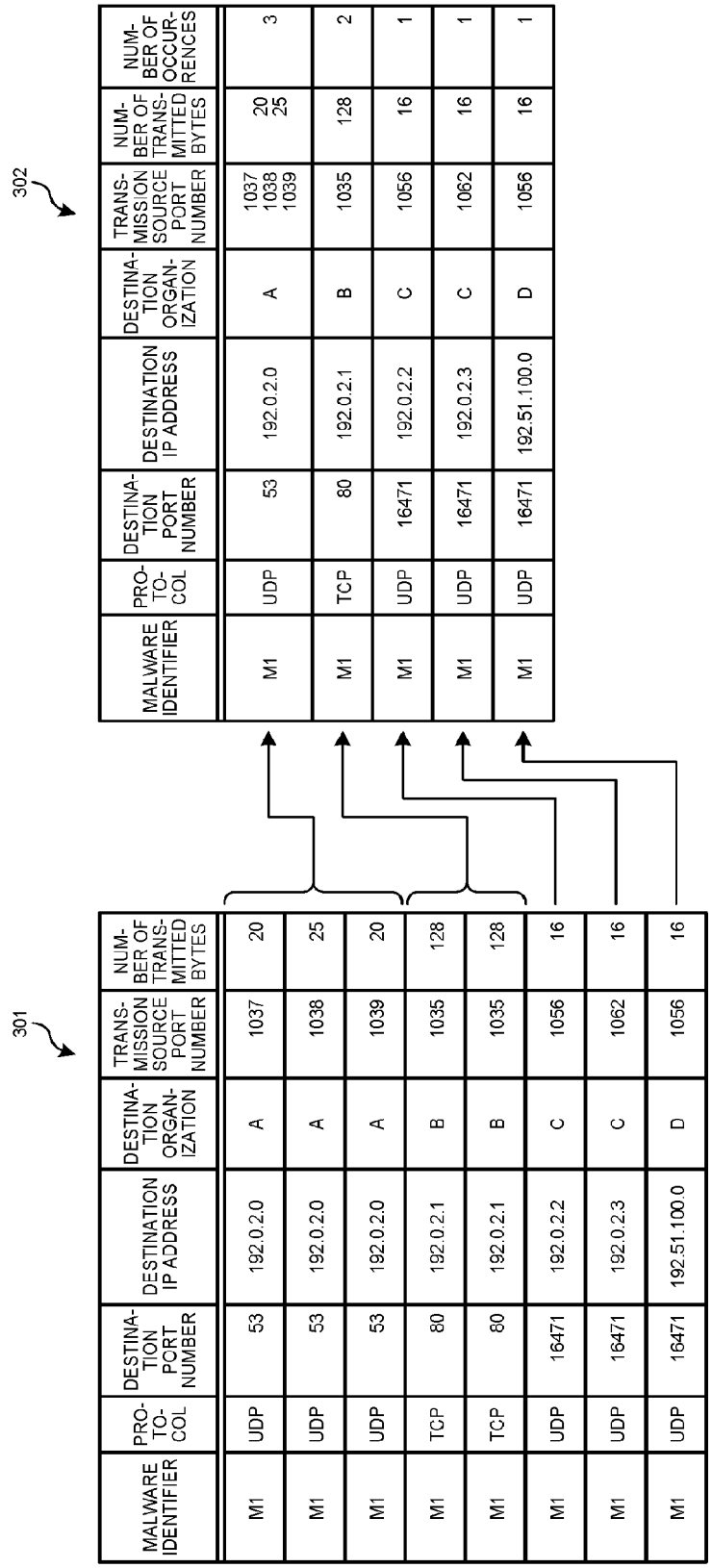
FIG. 3 is a diagram illustrating an example of extraction of unique traffic.

The communication pattern extraction unit 132 extracts communication patterns from the input log of traffic. Specifically, firstly, the communication pattern extraction unit 132 groups together traffic having the same values in a predetermined field, from the input log of traffic. That is, unique traffic is extracted. For example, the communication pattern extraction unit 132 groups together, from traffic indicated with a reference numeral 301 in FIG. 3, traffic having the same values for malware identifier, protocol, destination port number, destination organization, and destination IP address, and extracts, as unique traffic, traffic indicated with a reference numeral 302. Values of fields (transmission source port number and the number of transmitted bytes) other than those of malware identifier, protocol of traffic, destination port number, destination organization, and destination IP address are described as sets of values. Further, the total number of traffic grouped together as unique traffic is described as the number of occurrences.

When there is variation in values of any field in extracted unique traffic, the communication pattern extraction unit 132 summarizes the values of the field with the partial variation in the traffic. That is, when extracting communication patterns from traffic of malware, the communication pattern extraction unit 132 summarizes values of any field that take noise-like values, by replacing these values with a wild card (*), or the like (hereinafter, such processing being referred to as "wild card formation").

Figure 4:
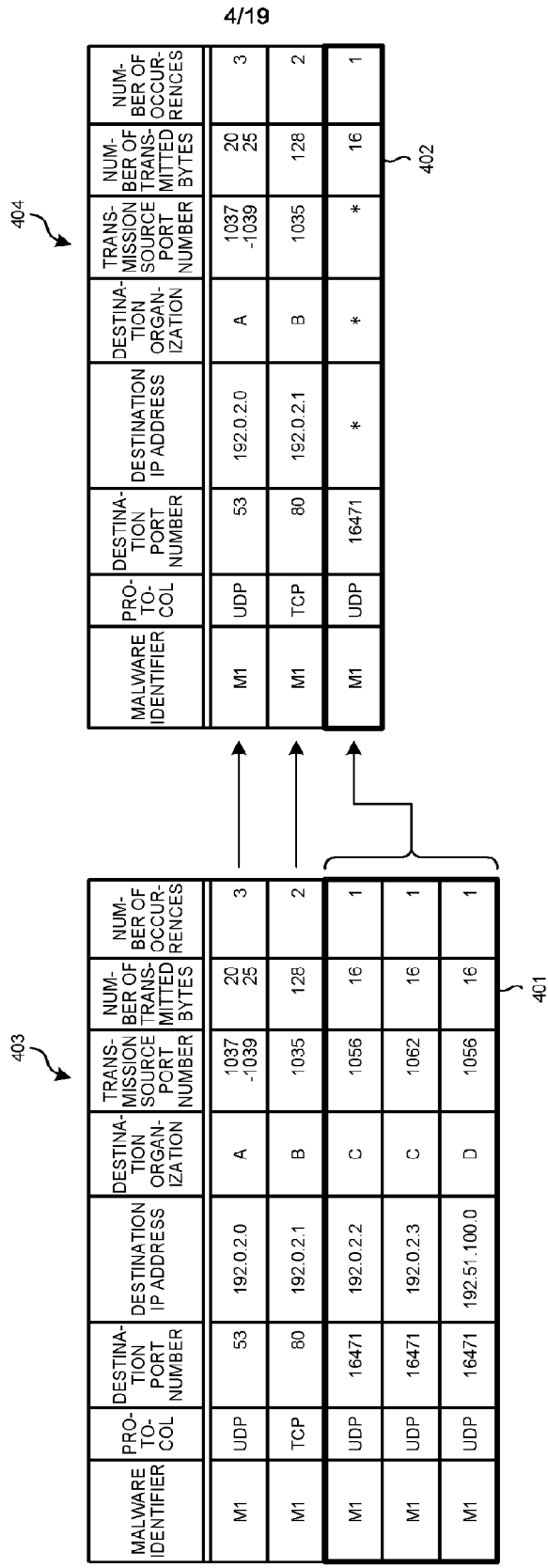
FIG. 4 is a diagram illustrating an example of wild card formation for communication patterns.

For example, among key items (for example, malware identifier, protocol, destination port number, destination IP address, and destination organization), a traffic group indicated with a reference numeral 401 illustrated in FIG. 4 has a malware identifier=M1, a protocol=UDP, and a destination port number=16471 in common, but has different values in each of the other fields. That is, values in each of these fields have variation. Thus, the communication pattern extraction unit 132 performs summarization by replacing the destination IP addresses, the destination organizations, and the transmission source port numbers, of the values of the fields of the traffic group indicated with the reference numeral 401, with wild cards (*) to thereby extract a communication pattern indicated with a reference numeral 402. This communication pattern indicated with the reference numeral 402 indicates that traffic of a piece of malware M1 includes noise-like traffic, with the protocol=UDP and the destination port number=16471 being common fields. By performing such processing, the communication pattern extraction unit 132 extracts three communication patterns indicated with a reference numeral 404, from a log of traffic groups of the malware identifier=M1 indicated with a reference numeral 403.

The clustering unit 133 classifies pieces of malware having similar communication patterns in their traffic, into the same cluster. For example, a case where communication patterns extracted by the communication pattern extraction unit 132 are communication patterns of pieces of malware having malware identifiers=M1, M2, and M3 indicated with a reference numeral 501 in FIG. 5 will be considered. In FIG. 5, illustration of information on the transmission source port numbers, the numbers of transmitted bytes, the numbers of occurrences, of the traffic, is omitted. In this case, the clustering unit 133 finds similarities between communication patterns of respective pieces of malware, with protocols, destination IP addresses, destination port numbers, destination organizations, and the like of the traffic of the respective pieces of malware being key items, and classifies highly similar pieces of malware into the same cluster. For example, the clustering unit 133 performs classification into a cluster of the malware identifiers=M1 and M2 indicated with a reference numeral 502, and a cluster of the malware identifier=M3 indicated with a reference numeral 503.

Further, if communication patterns of malware include a wild card (*), or if values of key items of the traffic partially match each other, in consideration thereof, the clustering unit 133 finds a similarity between pieces of malware. A method of calculating a similarity in such a case will be described later. In calculating a similarity, the clustering unit 133 may use traffic information of the traffic (information of all items included in the traffic), instead of information of respective items of communication patterns of malware.

The cluster specific communication pattern extraction unit 134 extracts, for each cluster classified by the clustering unit 133, any communication pattern, having an appearance rate in the traffic of the respective pieces of malware in the cluster, the appearance rate being equal to or larger than a predetermined value, as a malicious communication pattern. If a predetermined number or more of pieces of malware are not present in a cluster, extraction of a malicious communication pattern may be selected to be not performed.

For example, a case, where the pieces of malware with the malware identifiers=M1 and M2 belong to the same cluster (the cluster of the reference numeral 502) as a result of the clustering of the pieces of malware by the clustering unit 133, will be considered. In this case, the cluster specific communication pattern extraction unit 134 extracts, from this cluster, any communication pattern with an appearance rate in the traffic of both of the pieces of malware of the malware identifiers=M1 and M2, the appearance rate being equal to or larger than a predetermined value.

For example, three communication patterns appearing in the traffic of both of the pieces of malware of the malware identifiers=M1 and M2 are extracted. That is, of the communication patterns in the cluster indicated with the reference numeral 502 in FIG. 6, each of three communication patterns appears once or more in traffic of both of the malware identifiers=M1 and M2, and thus, the cluster specific communication pattern extraction unit 134 extracts these communication patterns as a malicious communication pattern (a communication pattern group of the malicious communication pattern identifier=S1), the three communication patterns being: (1) a communication pattern with the protocol=UDP, a destination port number=53, a destination IP address=192.0.2.0, and a destination organization=A; (2) a communication pattern with a protocol=TCP, a destination port number=80, a destination IP address=192.0.2.1, and a destination organization=B; and (3) a communication pattern with the protocol=UDP, the destination port number=16471, a destination IP address=*, and a destination organization=*.

On the contrary, a communication pattern with the protocol=TCP, the destination port number=80, a destination IP address=203.0.113.0, and the destination organization=A, appears only in traffic of the malware identifier=M1, and thus is not extracted as a malicious communication pattern. Since the cluster indicated with the reference numeral 503 has therein only communication patterns of the malware identifier=M3, these communication patterns are extracted as they are as a malicious communication pattern (a communication pattern group of the malicious communication pattern identifier=S2).

If there is any malicious communication pattern having a conformance rate to a traffic group not infected with malware, the conformance rate being equal to or larger than a predetermined value, in malicious communication patterns extracted by the cluster specific communication pattern extraction unit 134, the normal communication pattern elimination unit 135 eliminates that malicious communication pattern. That is, if the degree, at which an extracted malicious communication pattern also appears in normal communication, is high, the normal communication pattern elimination unit 135 does not output that malicious communication pattern as a malicious communication pattern. For example, the normal communication pattern elimination unit 135 eliminates a malicious communication pattern having a conformance rate to a traffic group not infected with malware, the conformance rate being equal to or larger than 0.75, from the malicious communication patterns (see FIG. 6) of the malicious communication pattern identifiers=S1 and S2 extracted by the cluster specific communication pattern extraction unit 134, for output to the storage unit 12.

The detection unit 136 performs matching processing with a malicious communication pattern for a traffic group to be subjected to detection, and detects any traffic having a conformance rate to this malicious communication pattern, the conformance rate being equal to or larger than a predetermined value, as abnormal traffic. For example, the detection unit 136 performs matching processing with malicious communication patterns (see the reference numerals 601 and 602 in FIG. 6) stored in the storage unit 12 for a traffic group to be subjected to detection, and if there is any traffic with a rate of the number of communication patterns conforming to (matching) any of the malicious communication patterns, the rate being equal to or larger than a predetermined value, the detection unit 136 detects that traffic as abnormal traffic. The detection unit 136 then outputs the result of the detection of the abnormal traffic via the input and output unit 11.

Although the normal communication pattern elimination unit 135 and the detection unit 136 have been described as components in the malicious communication pattern extraction apparatus 10, limitation is not made thereto. For example, functions of the normal communication pattern elimination unit 135 and the detection unit 136 may be realized by a device outside the malicious communication pattern extraction apparatus 10.

(Processing Sequence)

Next, a processing sequence by the malicious communication pattern extraction apparatus 10 will be described. Firstly, by use of FIG. 7, an outline of processing by the malicious communication pattern extraction apparatus 10 will be described.

The traffic input receiving unit 131 of the malicious communication pattern extraction apparatus 10 receives input of traffic (a log of the traffic) of malware (S1). The communication pattern extraction unit 132 then extracts communication patterns from the input traffic (S2), and the clustering unit 133 separates pieces of malware having similar communication patterns, from the communication patterns extracted in S2, into the same cluster (S3). Next, the cluster specific communication pattern extraction unit 134 extracts, for each cluster, any communication pattern having an appearance rate in the traffic of the respective pieces of malware in the cluster, the appearance rate being equal to or larger than a predetermined value, as a malicious communication pattern (S4). Thereafter, the normal communication pattern elimination unit 135 eliminates any malicious communication pattern with a conformance rate with a traffic group not infected with malware, the matching rate being equal to or larger than a predetermined threshold, from the malicious communication patterns extracted in S4 (S5). Thereafter, the detection unit 136 performs detection of any abnormal traffic by use of the malicious communication patterns obtained through the processing at S1 to S5. That is, the detection unit 136 performs matching with the malicious communication patterns obtained through the processing at S1 to S5 for traffic to be subjected to detection, and detects any traffic having a conformance rate equal to or larger than a predetermined value, as abnormal traffic.

Figure 7:
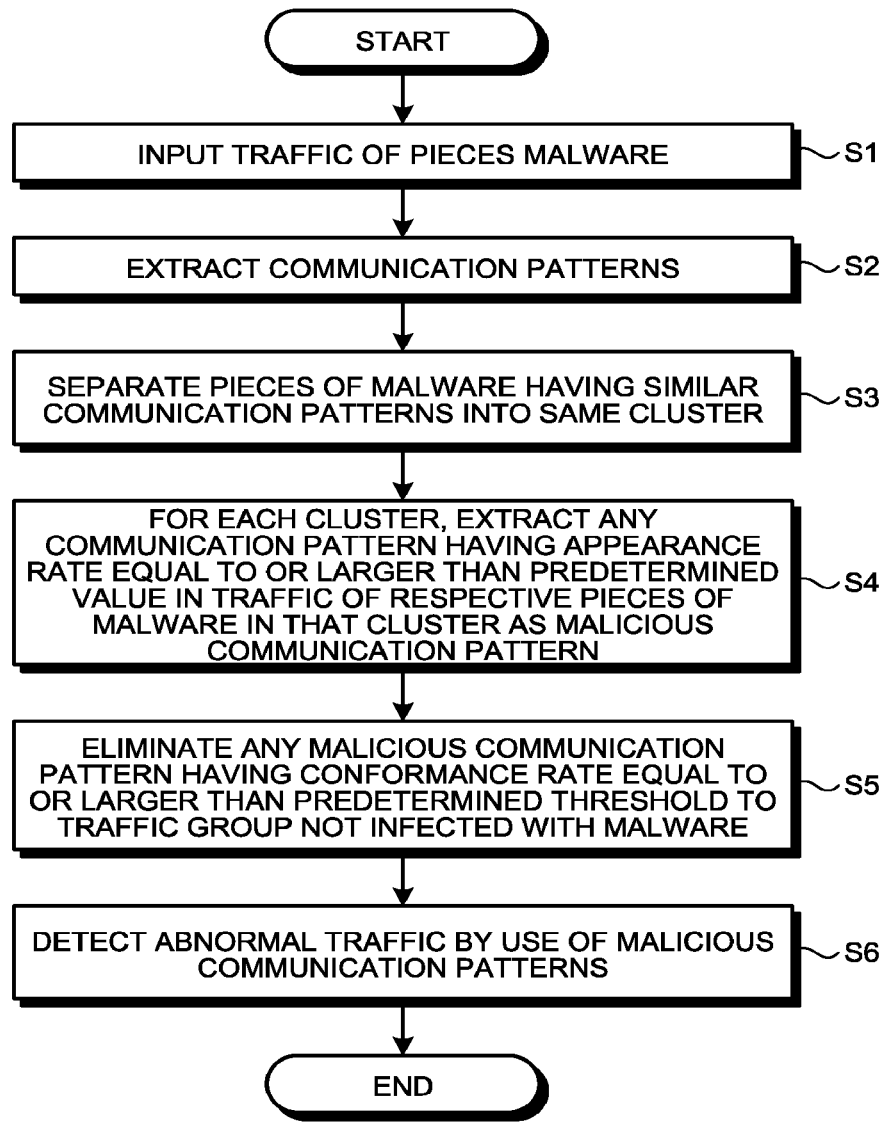
FIG. 7 is a flow chart illustrating a processing sequence by the malicious communication pattern extraction apparatus.
Figure 8:
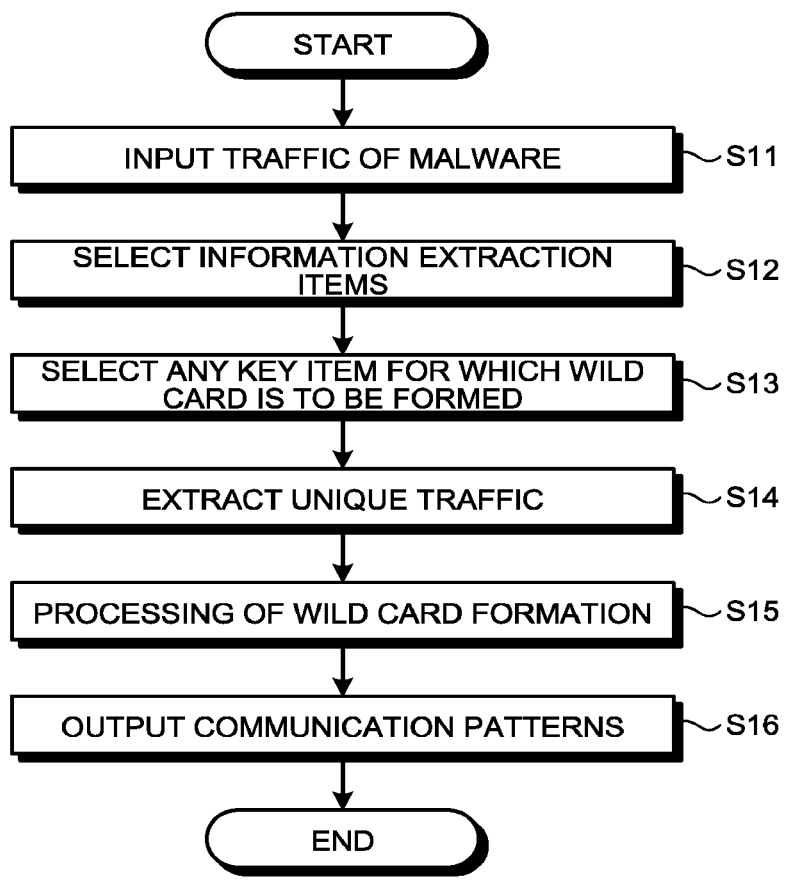
FIG. 8 is a flowchart illustrating details of processing at S1 and S2 in FIG. 7.

Next, by use of FIG. 8, the processing at S1 and S2 in FIG. 7 will be described in detail. Firstly, the traffic input receiving unit 131 receives input of traffic (a log of the traffic) of malware (S11). For example, input of a log of traffic of various types of malware is received. The communication pattern extraction unit 132 then receives selection of information extraction items of the input traffic (S12). For example, the communication pattern extraction unit 132 receives selection of protocol, destination port number, destination IP address, destination organization, transmission source port number, the number of transmitted bytes, and the like as information extraction items (fields) of the traffic. Further, the communication pattern extraction unit 132 receives selection of any key item to be subjected to wild card formation, from items of the traffic of malware (S13). For example, the communication pattern extraction unit 132 receives selection of protocol, destination port number, destination IP address, destination organization, and the like as key items to be subjected to wild card formation.

Thereafter, the communication pattern extraction unit 132 extracts values of the items (fields) selected in S12, from the input traffic, and performs, based on the extracted values, extraction of unique traffic (S14). For example, the communication pattern extraction unit 132 extracts any traffic, for which a combination of the values of protocol, destination port number, destination IP address, and destination organization, of the items selected in S12, is unique. For example, the communication pattern extraction unit 132 groups together, from the traffic group indicated with the reference numeral 301 in FIG. 3, traffic having the same malware identifier, protocol, destination port number, destination IP address, and destination organization, to thereby extract the unique traffic indicated with the reference numeral 302.

Subsequently, the communication pattern extraction unit 132 replaces values of a key item selected in S13, of the unique traffic extracted in S14, with a wild card (*) if the values have predetermined variation (S15: processing of wild card formation). For example, if values of destination IP address, destination organization, and transmission source port number have the predetermined variation in the traffic group indicated with the reference numeral 401 in FIG. 4, the communication pattern extraction unit 132 replaces the values of the items having the variation, with wild cards (*) and performs summarization into the communication pattern indicated with the reference numeral 402. The communication pattern extraction unit 132 then outputs the communication patterns extracted through the processing up to S15 (S16). For example, the communication pattern extraction unit 132 outputs the communication pattern group indicated with the reference numeral 404, including the communication pattern, which is indicated with the reference numeral 402 and has wild cards therein.

Figure 9:
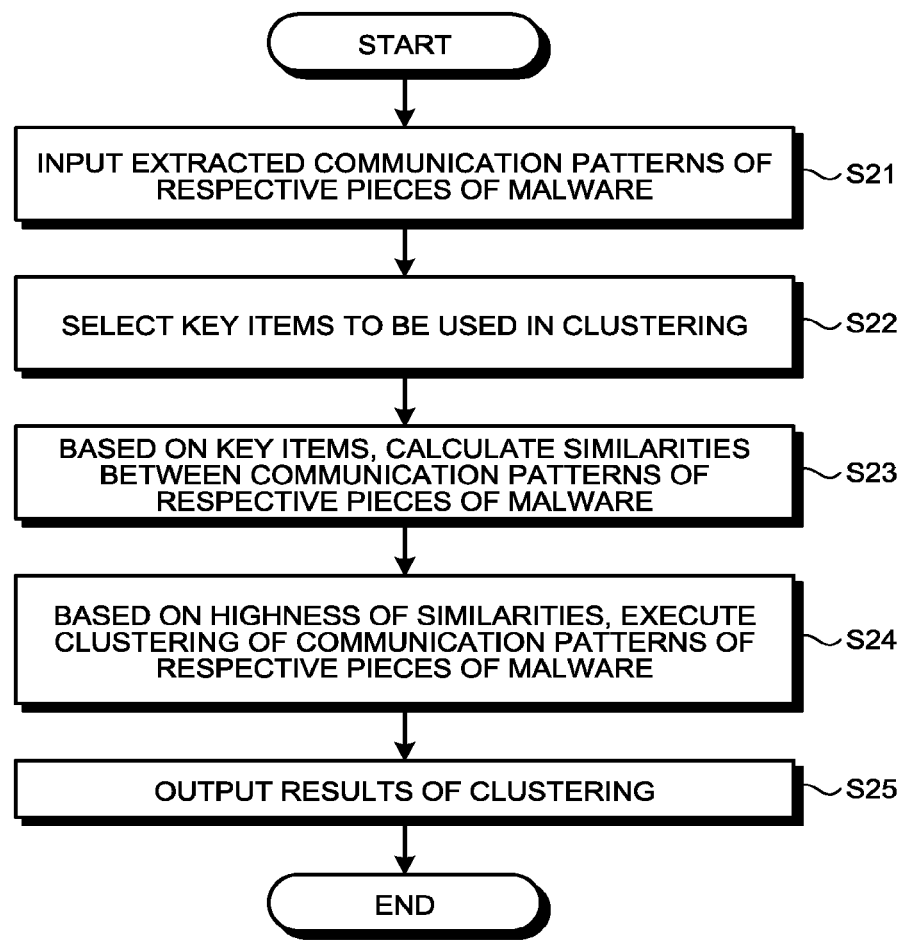
FIG. 9 is a flowchart illustrating details of processing at S3 in FIG. 7.

Next, by use of FIG. 9, the processing at S3 in FIG. 7 will be described in detail. Firstly, the clustering unit 133 receives input of communication patterns of respective pieces of malware extracted by the communication pattern extraction unit 132 (S21). For example, input of the communication pattern group indicated with the reference numeral 501 in FIG. 5 is received. Subsequently, the clustering unit 133 receives selection of key items to be used in clustering (S22). For example, the clustering unit 133 receives input of selection of protocol, destination IP address, destination port number, destination organization, and the number of occurrences, as key items.

Subsequently, the clustering unit 133 calculates, based on values of the key items selected in S22, similarities between communication patterns of the respective pieces of malware input in S21 (S23).

The clustering unit 133 then executes clustering of the communication patterns of the respective pieces of malware, based on highness of the similarities between the communication patterns of the respective pieces of malware calculated in S23 (S24), and outputs results of the clustering (S25). That is, the clustering unit 133 classifies those with high similarities therebetween calculated in S23, from the communication patterns of the respective pieces of malware, into the same cluster. For example, based on the similarities between the communication patterns of the respective pieces of malware indicated with the reference numeral 501 in FIG. 5, the clustering unit 133 performs classification into the cluster indicated with the reference numeral 502 and the cluster indicated with the reference numeral 503. Results of the clustering are then output.

If communication patterns of malware to be subjected to clustering includes a wild card (*), the clustering unit 133 performs similarity calculation in consideration thereof. Details of the similarity calculation in this case will be described later.

Next, by use of FIG. 10 and FIG. 11, the processing at S4 in FIG. 7 will be described in detail. Firstly, when input of the results of the clustering by the clustering unit 133 is received (S31 in FIG. 10), the cluster specific communication pattern extraction unit 134 extracts communication patterns for each cluster (S32), eliminates any redundant communication pattern in the clusters (S33), and outputs communication patterns of each cluster (S34).

Figure 10:
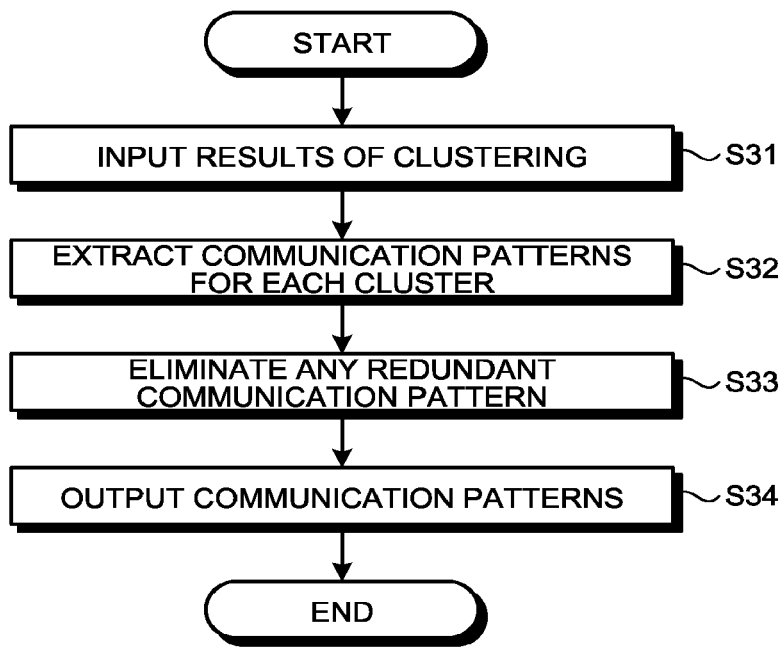
FIG. 10 is a flow chart illustrating details of processing at S4 in FIG. 7.
Figure 11:
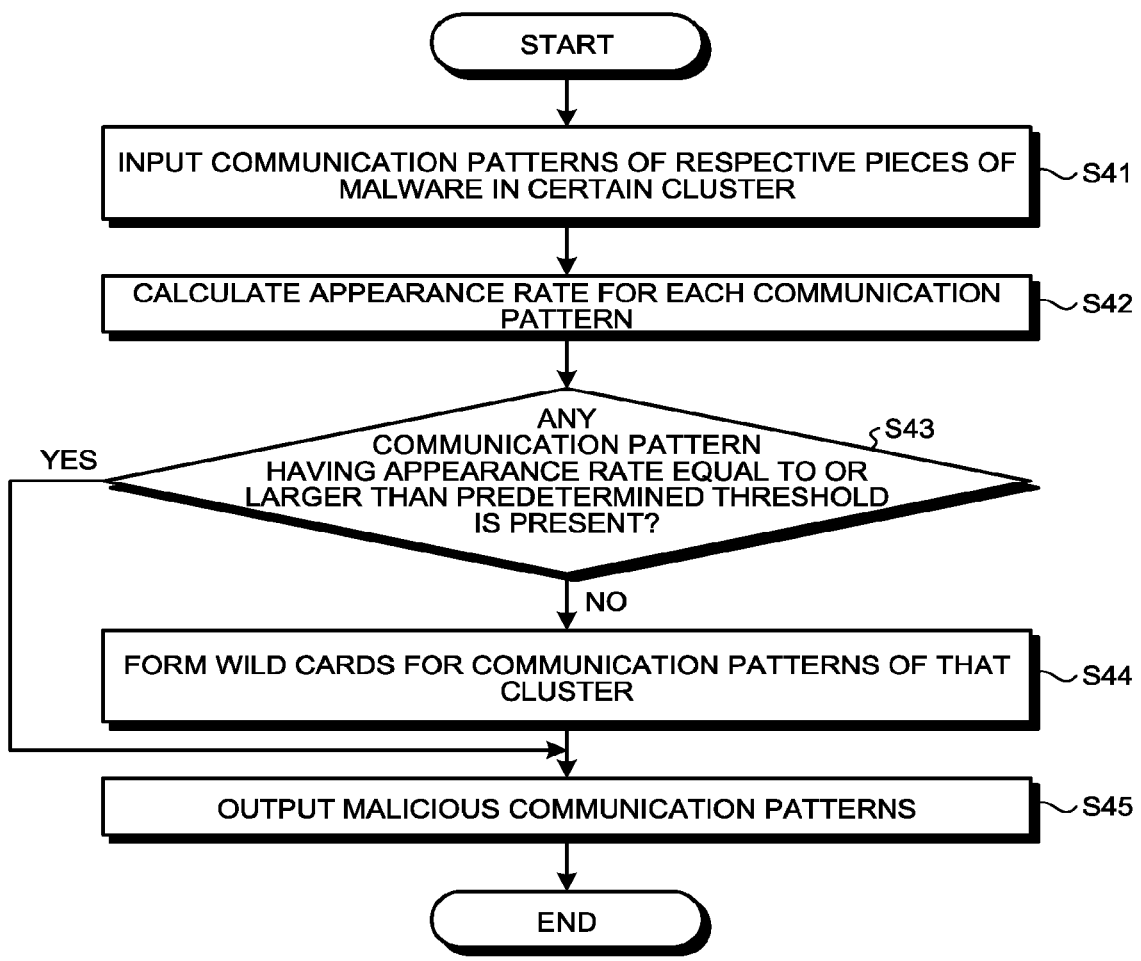
FIG. 11 is a flow chart illustrating details of processing at S4 in FIG. V.

After S34 in FIG. 10, when input of communication patterns of respective pieces of malware in a cluster is received (S41 in FIG. 11), the cluster specific communication pattern extraction unit 134 calculates an appearance rate for each communication pattern of the respective pieces of malware in that cluster (S42). For example, a case where ten pieces of malware are included in a cluster, and communication patterns included in that cluster are communication patterns A, B, and C will be considered. In this case, in how many of these pieces of malware in the cluster each of these communication patterns A, B, and C appears, is calculated. For example, if the communication pattern A appears in nine pieces of malware in the cluster, the appearance rate of the communication pattern A is 9/10=0.9. The cluster specific communication pattern extraction unit 134 performs such calculation for the communication patterns B and C also, to thereby calculate the appearance rate of each of the communication patterns.

Subsequently, the cluster specific communication pattern extraction unit 134 determines whether or not any communication pattern with an appearance rate equal to or larger than a predetermined threshold is present in the cluster (S43), and if there is any communication pattern with an appearance rate equal to or larger than the predetermined threshold (S43: Yes), the cluster specific communication pattern extraction unit 134 outputs that communication pattern as a malicious communication pattern (S45). On the contrary, if there is no communication pattern with an appearance rate equal to or larger than the predetermined threshold in the cluster (S43; No), the cluster specific communication pattern extraction unit 134 performs processing of wild card formation on the communication patterns of the cluster (S44) and outputs the communication patterns including any communication pattern that has been subjected to the wild card formation, as a malicious communication pattern (S45).

Figure 12:
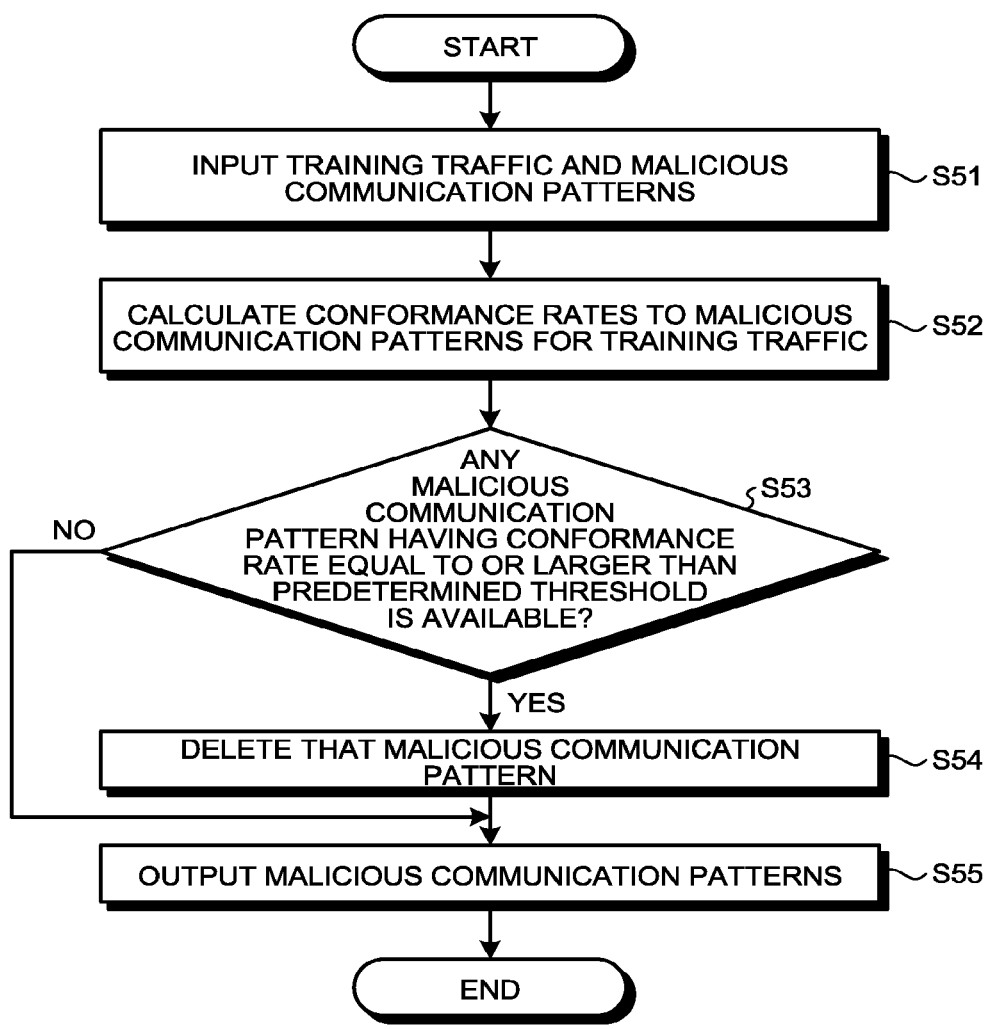
FIG. 12 is a flow chart illustrating details of processing at S5 in FIG. V.

Next, by use of FIG. 12, the processing at S5 in FIG. 7 will be described in detail. Firstly, the normal communication pattern elimination unit 135 receives input of training traffic, and the malicious communication patterns extracted by the cluster specific communication pattern extraction unit 134 (S51). As the training traffic, traffic that has been confirmed to be not infected with malware is used, for example.

Subsequently, the normal communication pattern elimination unit 135 calculates conformance rates to malicious communication patterns, for the training traffic (S52). This conformance rate is obtained by division of the number of condition satisfying patterns in the training traffic by the number of communication patterns included in the malicious communication pattern. For example, if the training traffic matches three communication patterns of the communication patterns of the malicious communication pattern identifier=S2 illustrated in FIG. 6 (the four communication patterns indicated with the reference numeral 602), the number of condition satisfying patterns is "3", and the number of communication patterns included in the malicious communication pattern is "4", and thus the conformance rate is 3/4=0.75. For each of the malicious communication patterns, the normal communication pattern elimination unit 135 performs such calculation of a conformance rate of the malicious communication pattern to the training traffic. If the training traffic matches a part of a communication pattern included in the malicious communication pattern, the conformance rate is calculated in consideration thereof. For example, if the training traffic completely matches two communication patterns and matches half of items of one communication pattern, the number of condition satisfying patterns is "2.5".

Subsequently, if there is any malicious communication pattern with a conformance rate calculated in S52, the conformance rate being equal to or larger than a predetermined threshold (S53; Yes), the normal communication pattern elimination unit 135 deletes that malicious communication pattern from the malicious communication patterns input in S51 (S54), and outputs the malicious communication patterns, from which that malicious communication pattern has been deleted (S55). For example, if the threshold for the conformance rate calculated in S52 is "0.5" and the conformance rate of the malicious communication pattern of the malicious communication pattern identifier=S2 calculated in S52 is "0.75", the normal communication pattern elimination unit 135 deletes the malicious communication pattern of the malicious communication pattern identifier=S2. On the contrary, if there is no malicious communication pattern with a conformance rate to a malicious communication pattern calculated in S52, the conformance rate being equal to or larger than the predetermined threshold (S53; No), the malicious communication patterns input in S51 are output as they are (S55).

If the malicious communication patterns include any communication pattern with a wild card, the normal communication pattern elimination unit 135 calculates the conformance rate in consideration thereof at S52. Details of the calculation of the conformance rate in this case will be described later.

Figure 13:
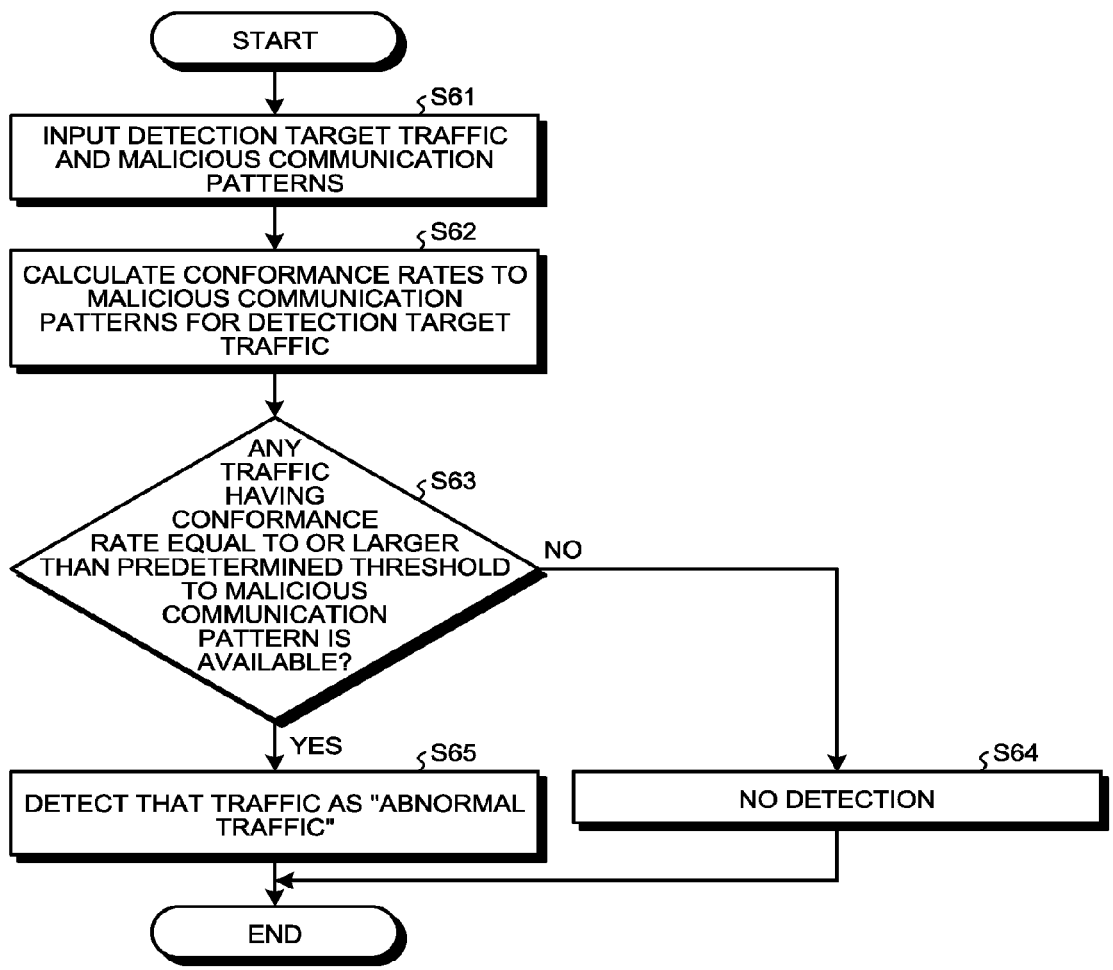
FIG. 13 is a flow chart illustrating details of processing at S6 in FIG. 7.

Next, by use of FIG. 13, S6 in FIG. 7 will be described in detail. Firstly, the detection unit 136 receives input of traffic to be subjected to detection, and malicious communication patterns (the malicious communication patterns obtained by the processing at S1 to S5 in FIG. 7) (S61).

Subsequently, the detection unit 136 calculates a conformance rate to a malicious communication pattern, for the traffic to be subjected to detection (S62). This conformance rate is obtained, similarly to S52 in FIG. 12, by division of the number of condition satisfying patterns in the traffic to be subjected to detection by the number of communication patterns included in the malicious communication pattern.

Subsequently, if there is any traffic with a conformance rate to the malicious communication pattern calculated in S62, the conformance rate being equal to or larger than a predetermined threshold (S63; Yes), the detection unit 136 detects that traffic as "abnormal traffic" (S65), and outputs this detection result. On the contrary, if there is no traffic with a conformance rate to the malicious communication pattern calculated in S62, the conformance rate being equal to or larger than the predetermined threshold (S63; No), it is determined that no abnormal traffic has been detected (S64) and this detection result is output. If the malicious communication pattern includes any communication pattern with a wild card, the detection unit 136 calculates the conformance rate in consideration thereof, similarly to S52 in FIG. 12 described above.

Further, for traffic detected as abnormal traffic in S65, the detection unit 136 may detect a transmission source IP address of that traffic as a terminal infected with malware.

The malicious communication pattern extraction apparatus 10 described above enables: reduction in the number of communication patterns to be used in detection of malware; and accurate detection of malware.

(Wild Card Formation)

Figure 14:
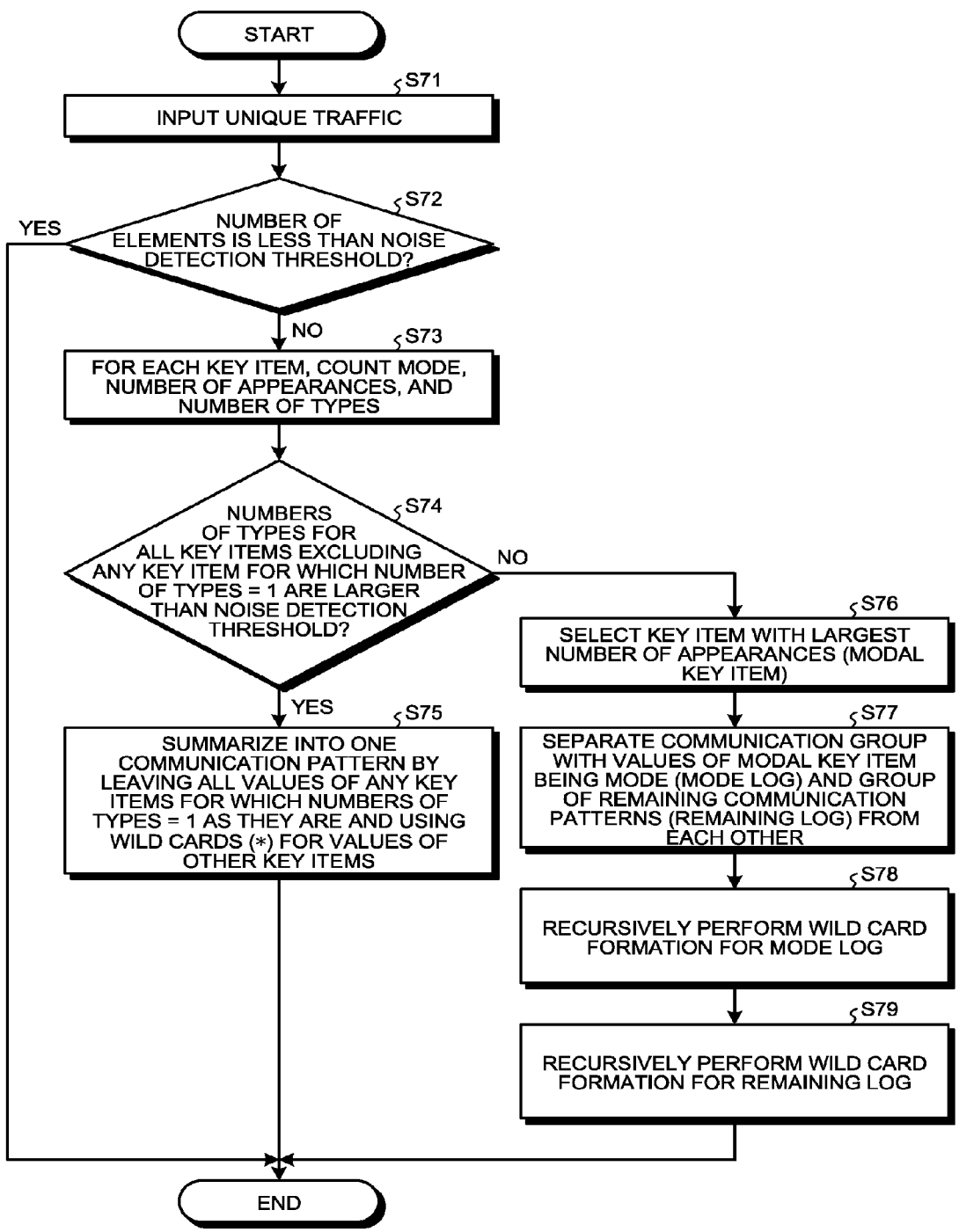
FIG. 14 is a flow chart illustrating details of processing at S15 in FIG. 8.

Next, by use of FIG. 14, the processing of wild card formation for a communication pattern in S15 of FIG. 8 will be described in detail. A noise detection threshold is a value settable as appropriate by an administrator or the like of the malicious communication pattern extraction apparatus 10, and is, for example, "3", herein. Firstly, when the communication pattern extraction unit 132 receives input of communication patterns of unique traffic extracted in S14 of FIG. 8 (S71), the communication pattern extraction unit 132 determines whether or not the communication pattern element count (the number of the communication patterns) is less than the noise detection threshold (S72), and if the communication pattern element count (the number of the communication patterns) is less than the noise detection threshold (S72; Yes), the communication pattern extraction unit 132 outputs the communication patterns of that unique traffic as they are, and ends the processing.

On the contrary, if the communication pattern element count (the number of the communication patterns) is equal to or larger than the noise detection threshold (S72; No), the communication pattern extraction unit 132 counts the mode, the number of appearances, and the number of types, for each of key items (for example, protocol, destination port number, destination IP address, and destination organization) of the targeted unique traffic (S73). The mode is a value that appears most frequently in a key item, the number of appearances is the number of times that the mode has appeared, and the number of types is the number of types in the key item. For example, for the item, protocol, of unique traffic illustrated in FIG. 15, the number of types of protocols is "2", the mode is "UDP", and the number of appearances is "4". The communication pattern extraction unit 132 performs such counting for each of the key items.

Subsequently, the communication pattern extraction unit 132 determines whether or not the numbers of types in all of the key items excluding any key item with the number of types=1 exceed the noise detection threshold (S74). If the numbers of types in all of the key items excluding any key item with the number of types=1 exceed the noise detection threshold (S74; Yes), the communication pattern extraction unit 132 performs summarization into a single communication pattern by using all of the values of any key items with the numbers of types=1 as they are and using wild cards (*) for the values of the other key items (S75). Values of non-key items are concatenated with, for example, appropriate delimiters or the like. The processing of wild card formation is then ended.

On the contrary, if there is any key item with the number of types equal to or less than the noise detection threshold in the key items other than any key item with the number of types=1 (S74; No), the communication pattern extraction unit 132 selects a key item with the largest number of appearances (modal key item) (S76). For example, since the communication patterns of the unique traffic illustrated in FIG. 15 have key items not exceeding the noise detection threshold (for example, "3"), "protocol", which is a key item with the largest number of appearances ("4"), is selected.

Figure 15:
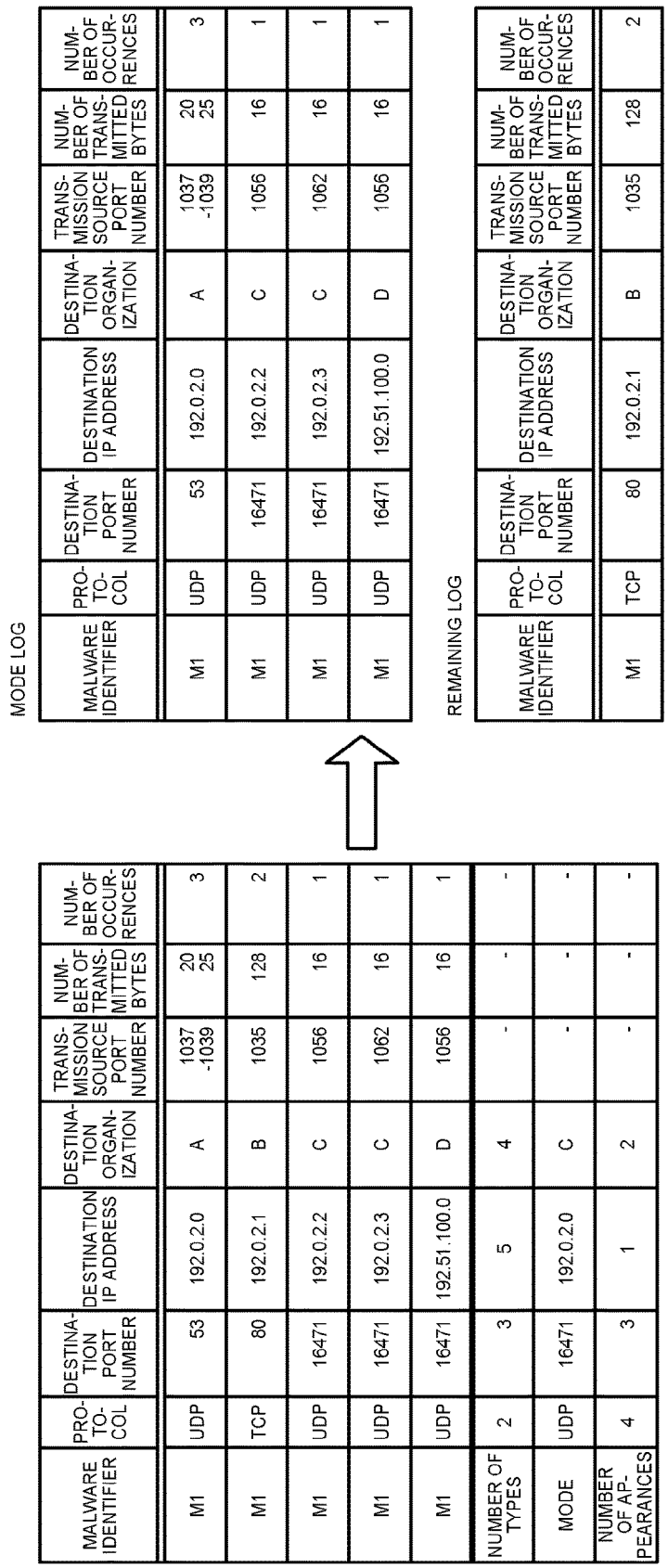
FIG. 15 is a diagram illustrating an example of: count results for mode, the number of appearances, and the number of types, for the unique traffic; and separation into a mode log and a remaining log, based on the count results.

The communication pattern extraction unit 132 then performs separation into a communication pattern group (mode log) with values in the modal key item (for example, "protocol") being the mode (for example, "UDP"), and a group of the remaining communication patterns (remaining log) (S77). For example, as illustrated in FIG. 15, the communication pattern extraction unit 132 separates the communication pattern group with the protocol=UDP as a mode log and the group of the remaining communication patterns as a remaining log.

Subsequently, the communication pattern extraction unit 132 recursively performs processing of wild card formation for the mode log (see FIG. 15) separated in S77 (S78). That is, processing that is the same as the above described processing at S72 and after is performed again on the mode log (see FIG. 15). Further, the communication pattern extraction unit 132 recursively performs processing of wild card formation for the remaining log (see FIG. 15) separated in S77 (S79). That is, processing that is the same as the above described processing at S72 and after is performed again on the remaining log (see FIG. 15). The communication pattern extraction unit 132 then ends the processing of wild card formation when the number of elements in the separated log becomes less than a predetermined noise detection threshold, and outputs the respective logs separated in the process of the processing by uniting them together.

Accordingly, the communication pattern extraction unit 132 is able to summarize communication patterns with predetermined variation in values of a key item.

(Method of Calculating Similarity when Communication Patterns Include Partial Match or Wild Card (*))

Next, a method of calculating a similarity, in similarity calculation between respective pieces of malware by the clustering unit 133, when communication patterns of the pieces of malware include a partial match or a wild card (*), will be described. A similarity herein is calculated by the following Equation (1) with a Jaccard coefficient being applied thereto. Pieces of malware 1 and 2 below represent pieces of malware to be subjected to similarity calculation.

$$\text{Similarity} = (\text{Sum of respective matching rates of communication patterns of piece of malware 1 and communication patterns of piece of malware 2})/\{(\text{Number of communication patterns of piece of malware 1}) + (\text{Number of communication patterns of piece of malware 2}) - (\text{Sum of respective matching rates of communication patterns of piece of malware 1 and communication patterns of piece of malware 2})\} \quad (1)$$

When communication patterns with wild cards completely match each other, a matching rate of the communication patterns with wild cards is equal to a predetermined noise detection threshold, and if there is no communication pattern that matches a communication pattern with a wild card, the matching rate is equal to "0". Further, if a communication pattern with a wild card has a partial match, the matching rate is "0".

Further, a matching rate of a communication pattern without a wild card is defined as expressed by Equation (4) below.

$$\text{Matching rate} = (\text{Number of matching key items of communication pattern})/(\text{Sum of number of key items of communication pattern}) \quad (4)$$

Further, if communication patterns of each piece of malware include any communication pattern with a wild card, the count for that communication pattern is replaced with the "noise detection threshold" for addition.

By use of FIG. 16 and FIG. 17, examples of similarity calculation will be described. Firstly, an example of similarity calculation in a case where communication patterns of the piece of malware having the malware identifier=M1 and communication patterns of the malware identifier=M2 illustrated in FIG. 16 are used and their communication patterns partially match each other, will be described.

Key items of a communication pattern of an individual identifier=M1-$a$ and a communication pattern of an individual identifier=M2-$a$ in FIG. 16 partially match each other, and key items of a communication pattern of an individual identifier=M1-$b$ and a communication pattern of an individual identifier=M2-$b$ completely match each other. Key items matching those of a communication pattern of an individual identifier=M1-$d$ are not present in the communication patterns of the piece of malware having the malware identifier=M2. Based on Equation (4), a matching rate between the communication pattern of the individual identifier=M1-$a$ and the communication pattern of the individual identifier=M2-$a$ is able to be calculated to be "3/4=0.75", and a matching rate between the communication pattern of the individual identifier=M1-$b$ and the communication pattern of the individual identifier=M2-*b* is able to be calculated to be "4/4=1.0". Thus, based on Equation (1), the similarity=(0.75+1.0)/{(3)+(2)−(0.75+1.0)}=0.538.

Next, an example of similarity calculation in a case, where communication patterns of the piece of malware having the malware identifier=M1 and communication patterns of the malware identifier=M2 illustrated in FIG. 17 are used and the communication patterns include wild cards (*), will be described. The key items of the communication pattern of the individual identifier=M1-*a* and the communication pattern of the individual identifier=M2-*a* in FIG. 17 partially match each other, and the key items of the communication pattern of the individual identifier=M1-*b* and the communication pattern of the individual identifier=M2-*b* completely match each other. Each of a communication pattern of an individual identifier=M1-*c* and a communication pattern of an individual identifier=M2-*c* include wild cards (*), and their key items completely match each other. Key items matching those of the communication pattern of the individual identifier=M1-*d* are not present in the communication patterns of the piece of malware having the malware identifier=M2. Based on Equation (4), the matching rate between the communication pattern of the individual identifier=M1-*a* and the communication pattern of the individual identifier=M2-*a* is able to be calculated to be "3/4=0.75", and the matching rate between the communication pattern of the individual identifier=M1-*b* and the communication pattern of the individual identifier=M2-*b* is able to be calculated to be "4/4=1.0", similarly to the above. Further, since each of the communication pattern of the individual identifier=M1-*c* and communication pattern of the individual identifier=M2-*c* includes wild cards (*), their matching rate becomes "3" when the noise detection threshold=3. Therefore, based on Equation (1), when the noise detection threshold=3, the similarity=(3+0.75+1.0)/{(3+3)+(3+2)−(3+0.75+1.0)}=0.76.

Accordingly, even if communication patterns of pieces of malware partially match each other or include wild cards (*), the clustering unit 133 is able to calculate their similarity in consideration thereof.

(Method of Calculating Conformance Rate when Communication Pattern Includes Wild Card (*))

Next, a method of calculating a conformance rate when a communication pattern includes any wild card (*) will be described. The conformance rate is obtained, as described above, by division of the number of condition satisfying patterns by the number of communications included in a malicious communication pattern. When the communication pattern includes any wild card (*), if the number of times that this communication pattern appears in traffic to be subjected to conformance rate calculation is larger than a predetermined noise detection threshold (for example, "2"), a condition is determined to be satisfied with respect to that communication pattern.

For example, a case, where the normal communication pattern elimination unit 135 calculates a conformance rate of the malicious communication pattern of the communication pattern identifier=S1 to training traffic indicated with a reference numeral 180 in FIG. 18, will be described. The noise detection threshold in this case is "3". Of communication patterns of the malicious communication pattern of the communication pattern identifier=S1 illustrated in FIG. 18, a communication pattern of an individual identifier=S1-*a* is not included in the training traffic, and thus it is determined that satisfaction of condition is not OK, but a communication pattern of an individual identifier=S1-*b* is included in the training traffic (satisfaction of condition being OK). Further, a communication pattern of an individual identifier=S1-*c* is a communication pattern with wild cards, and since the number of times that this communication pattern appears in the training traffic is larger than the noise detection threshold ("2"), it is determined that satisfaction of condition is OK. Therefore, the normal communication pattern elimination unit 135 calculates the conformance rate to be "2/3=0.66".

Further, the detection unit 136 also calculates a conformance rate of a malicious communication pattern by a calculation method similar to the above, for traffic to be subjected to detection.

Accordingly, even when any communication pattern with a wild card is included in a malicious communication pattern, the normal communication pattern elimination unit 135 and the detection unit 136 are able to calculate the conformance rate in consideration thereof.

(Program)

Further, a program, which describes the processing executed by the malicious communication pattern extraction apparatus 10 according to the above described embodiment in a language executable by a computer, may be generated and executed. In this case, by the computer executing the program, effects that are the same as those of the above described embodiment are able to be obtained. Further, by recording this program in a computer readable recording medium, and causing the computer to load and execute the program recorded in this recording medium, processing that is the same as that of the above described embodiment may be realized. Hereinafter, an example of a computer, which executes a control program that realizes functions that are the same as those of the malicious communication pattern extraction apparatus 10, will be described.

FIG. 19 is a diagram illustrating a computer that executes a malicious communication pattern extraction program. As illustrated in FIG. 19, a computer 1000 has, for example, a memory 1010, a central processing unit (CPU) 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. An attachable and detachable storage medium, such as a magnetic disk or an optical disk, for example, is inserted in the disk drive 1100. A mouse 1110 and a keyboard 1120, for example, are connected to the serial port interface 1050. To the video adapter 1060, for example, a display 1130 is connected.

As illustrated in FIG. 19, the hard disk drive 1090 stores therein, for example, an OS 1091, an application program 1092, a program module 1093, and program data 1094. The respective pieces of information described in the above described embodiment are, for example, stored in the hard disk drive 1090, or the memory 1010.

Further, the malicious communication pattern extraction program is stored, as a program module, in which commands executed by the computer 1000 are described, for example, in the hard disk drive 1090. Specifically, a program module, in which the processing executed by the malicious communication pattern extraction apparatus 10 described in the above embodiment is described, is stored in the hard disk drive 1090.

Further, data used in information processing by the malicious communication pattern extraction program are stored as program data in, for example, the hard disk drive 1090. The CPU 1020 loads the program module 1093 or the program data 1094 stored in the hard disk drive 1090 as necessary into the RAM 1012 and executes the above described sequences.

The program module 1093 and the program data 1094 related to the malicious communication pattern extraction program are not necessarily stored in the hard disk drive 1090, and for example, may be stored in an attachable and detachable storage medium and read out by the CPU 1020 via the disk drive 1100 or the like. Or, the program module 1093 and the program data 1094 related to the control program may be stored in another computer connected via a network, such as a local area network (LAN) or a wide area network (WAN), and read out by the CPU 1020 via the network interface 1070. Further, data may be collected by the network interface 1070 or the like collecting packets on a real time basis.

REFERENCE SIGNS LIST

10 MALICIOUS COMMUNICATION PATTERN EXTRACTION APPARATUS
11 INPUT AND OUTPUT UNIT
12 STORAGE UNIT
13 CONTROL UNIT
131 TRAFFIC INPUT RECEIVING UNIT
132 COMMUNICATION PATTERN EXTRACTION UNIT
133 CLUSTERING UNIT
134 CLUSTER SPECIFIC COMMUNICATION PATTERN EXTRACTION UNIT
135 NORMAL COMMUNICATION PATTERN ELIMINATION UNIT
136 DETECTION UNIT

The invention claimed is:

1. A malicious communication pattern extraction apparatus, comprising:
   processing circuitry configured to
     receive input of a traffic group of one or more pieces of malware, each item in the input traffic group has a same set of fields which each define different values that characterize a communication of the item;
     extract communication patterns from the input traffic group, each of the communication patterns being defined by one or more values in one or more respective fields having a same value, and extract, when extracting communication patterns from the input traffic group, any traffic group of the input traffic group containing a variation of values of a predetermined field among the one or more respective fields, and replacing the variation of values with a wild card and including the wild card corresponding to the predetermined field within the communication patterns;
     classify pieces of malware with the extracted communication patterns similar to each other, into the same cluster;
     extract, for each of the clusters, a communication pattern group as a malicious communication pattern, the communication pattern group having an appearance rate in traffic of respective pieces malware belonging to that cluster, the appearance rate being equal to or larger than a predetermined value; and
     eliminate, from the extracted malicious communication patterns, any malicious communication pattern having a conformance rate to a traffic group not infected with malware, the conformance rate being equal to or larger than a predetermined value.

2. The malicious communication pattern extraction apparatus according to claim 1, wherein the processing circuitry classifies pieces of malware into the same cluster, the pieces of malware having their communication patterns or pieces of traffic information of their traffic that are similar to each other, the pieces of malware being from the one or more pieces of malware.

3. The malicious communication pattern extraction apparatus according to claim 1, wherein the processing circuitry performs matching processing for a traffic group to be subjected to detection, with the malicious communication pattern, and detects, as abnormal traffic, any traffic having a rate of the number of communications matching communication patterns included in the malicious communication pattern, the rate being equal to or larger than a predetermined value.

4. The malicious communication pattern extraction apparatus according to claim 3, wherein in a case where the malicious communication pattern includes a communication pattern, for which values in the predetermined field have been replaced with a wild card, the processing circuitry determines that the communication pattern matches when a predetermined number or more of the communication patterns are present in the traffic group to be subjected to detection.

5. The malicious communication pattern extraction apparatus according to claim 1, wherein in a case where the malicious communication pattern includes a communication pattern, for which values in the predetermined field have been replaced with a wild card, the processing circuitry determines that the communication pattern matches the traffic group not infected with malware and calculates the conformance rate, when a predetermined number or more of the communication patterns are present in the traffic group infected with malware.

6. A malicious communication pattern extraction method, including:
   receiving input of a traffic group of one or more pieces of malware, each item in the input traffic group has a same set of fields which each define different values that characterize a communication of the item;
   extracting communication patterns from the input traffic group, each of the communication patterns being defined by one or more values in one or more respective fields having a same value,
   extracting, when extracting communication patterns from the input traffic group, any traffic group of the input traffic group containing a variation of values of a predetermined field among the one or more respective fields, and replacing the variation of values with a wild card and including the wild card corresponding to the predetermined field within the communication patterns;
   classifying pieces of malware with the extracted communication patterns similar to each other, into the same cluster;
   extracting, for each of the clusters, a communication pattern group as a malicious communication pattern, the communication pattern group having an appearance rate in respective traffic of pieces of malware belonging to that cluster, the appearance rate being equal to or larger than a predetermined value; and eliminating, from the extracted malicious communication patterns, any malicious communication pattern having a conformance rate to a traffic group not infected with malware, the conformance rate being equal to or larger than a predetermined value.

7. A non-transitory computer readable storage medium having stored therein a malicious communication pattern extraction program that causes a computer to execute a process comprising:

receiving input of a traffic group of one or more pieces of malware, each item in the input traffic group has a same set of fields which each define different values that characterize a communication of the item;

extracting communication patterns from the input traffic group, each of the communication patterns being defined by one or more values in one or more respective fields having a same value, extracting, when extracting communication patterns from the input traffic group, any traffic group of the input traffic group containing a variation of values of a predetermined field among the one or more respective fields, and replacing the variation of values with a wild card and including the wild card corresponding to the predetermined field within the communication patterns;

classifying pieces of malware with the extracted communication patterns similar to each other, into the same cluster;

extracting, for each of the clusters, a communication pattern group as a malicious communication pattern, the communication pattern group having an appearance rate in respective traffic of pieces of malware belonging to that cluster, the appearance rate being equal to or larger than a predetermined value; and eliminating, from the extracted malicious communication patterns, any malicious communication pattern having a conformance rate to a traffic group not infected with malware, the conformance rate being equal to or larger than a predetermined value.

* * * * *